(12) United States Patent
Tatarkiewicz et al.

(10) Patent No.: US 12,034,834 B1
(45) Date of Patent: Jul. 9, 2024

(54) METHOD AND APPARATUS FOR STEGANOGRAPHIC CIPHER ENCRYPTION USING TRUE RANDOM NUMBER GENERATOR

(71) Applicant: RANDAEMON sp. z o.o., Warsaw (PL)

(72) Inventors: Jan Jakub Tatarkiewicz, San Diego, CA (US); Wieslaw Bohdan Kuźmicz, Warsaw (PL)

(73) Assignee: RANDAEMON SP. Z O.O., Warsaw (PL)

( * ) Notice: Subject to any disclaimer, the term of this patent is extended or adjusted under 35 U.S.C. 154(b) by 0 days.

(21) Appl. No.: 18/113,368

(22) Filed: Feb. 23, 2023

Related U.S. Application Data (60) Provisional application No. 63/441,979, filed on Jan. 30, 2023.

(51) Int. Cl.
*H04L 9/06* (2006.01)
*H04L 9/08* (2006.01)

(52) U.S. Cl.
CPC ............ *H04L 9/0662* (2013.01); *H04L 9/085* (2013.01); *H04L 9/0869* (2013.01)

(58) Field of Classification Search
CPC ...... H04L 9/0662; H04L 9/085; H04L 9/0869
See application file for complete search history.

(56) References Cited

U.S. PATENT DOCUMENTS

| | | |
|---|---|---|
| 3,445,591 A | 5/1969 | Koehler |
| 3,546,356 A | 12/1970 | Graybill |
| 3,790,768 A | 2/1974 | Chevalier |
| 4,527,798 A | 7/1985 | Siekierski |
| 4,855,690 A | 8/1989 | Dias |
| 4,905,176 A | 2/1990 | Schulz |
| 5,570,307 A | 10/1996 | Takahshi |
| 5,627,894 A | 5/1997 | Albert |
| 5,732,138 A | 3/1998 | Noll |
| 5,987,483 A * | 11/1999 | Edelkind ................. G06F 7/588 708/250 |
| 6,249,009 B1 | 6/2001 | Kim |
| 8,001,054 B1 | 8/2001 | Peart |
| 6,346,700 B1 | 2/2002 | Cunningham |
| 6,415,309 B1 | 7/2002 | Shilton |
| 6,430,170 B1 | 8/2002 | Saints |
| 6,539,410 B1 | 3/2003 | Klass |
| 6,542,014 B1 | 4/2003 | Saito |
| 6,687,721 B1 | 2/2004 | Wells |
| 6,697,829 B1 | 2/2004 | Shilton |

(Continued)

FOREIGN PATENT DOCUMENTS

WO 2014080272 A1 5/2014

OTHER PUBLICATIONS

B. Škorić 2015 Lecture notes 2IMS10 Technical University Eindhoven (Holland) Physical aspects of digital security.

(Continued)

*Primary Examiner* — Philip J Chea
*Assistant Examiner* — Sangseok Park
(74) *Attorney, Agent, or Firm* — Manuel de la Cerra (57) ABSTRACT

A method for encryption that combines the steganographic method of concealing data inside a truly random string of bits with a cryptographic key that allows for the random distribution of this data, essentially creating a symmetrical cipher.

28 Claims, 5 Drawing Sheets

(56) References Cited

U.S. PATENT DOCUMENTS

| | | |
|---|---|---|
| 6,745,217 B2 | 6/2004 | Figotkin |
| 7,031,991 B2 | 4/2006 | Hars |
| 7,124,157 B2 | 10/2006 | Ikake |
| 7,476,370 B2 | 1/2009 | Mitsugashira |
| 8,001,168 B2 | 8/2011 | Tsuyuzaki |
| 8,037,117 B2 | 10/2011 | Saito |
| 9,335,972 B2 | 5/2016 | Yang |
| 10,430,161 B1 | 10/2019 | Tatarkiewicz |
| 2004/0035201 A1 | 2/2004 | Vincze |
| 2007/0189528 A1* | 8/2007 | Ueda ............... H04W 12/033 380/44 |
| 2009/0165086 A1 | 6/2009 | Trichina |
| 2012/0030268 A1 | 2/2012 | Liu |
| 2015/0064047 A1 | 3/2015 | Elwha |
| 2016/0112189 A1* | 4/2016 | Tomaru ............... H04L 9/0822 380/268 |
| 2018/0217817 A1 | 8/2018 | Gorfinkle |
| 2019/0258458 A1 | 8/2019 | Walmsley |
| 2019/0305942 A1* | 10/2019 | Cambou ............... H04L 9/0852 |
| 2019/0310830 A1* | 10/2019 | Tatarkiewicz ......... G06F 7/588 |
| 2019/0347076 A1 | 11/2019 | Park |
| 2020/0065068 A1 | 2/2020 | Hekmatshoartabari |
| 2020/0092328 A1 | 3/2020 | Kim |
| 2020/0210147 A1 | 7/2020 | Lee |

OTHER PUBLICATIONS

D.F. Williams et al. 1993 Oak Ridge National Laboratory TM-12399 Recovery and Purification of Nickel-63 from HFIR-irradiated Targets.

J. von Neumann 1951 Res. Nat. Bur. Stand. Appl. Math. Series 3, 36-38 Various techniques used in connection with random digits.

M.J. Berger and S.M. Seltzer 1982 National Bureau of Standards NBSIR 82-2550 Stopping Powers and Ranges of Electrons and Positrons.

M.-M. Be et al. 2008 Bureau International des Poids et Mesures, Sevres (France) BIPM-5 vol. 1-4 Table of Radionuclides.

NRC Personal Annual Radiation Dose Calculator https://www.nrc.gov/aboutnrc/radiation/around-us/calculator.html.

Patuleanu et al. 2017 Proc. Romanian Acad. series A, vol. 18, 389-402 True random humber sequences from gamma-decay using four extraction methods.

International Search Report in PCT/US2020/065962 dated Apr. 22, 2020 (6 pages).

International Search Report and Written Opinion for PCT/US2019/017748 mailed Dec. 30, 2019 (6 pages).

Jones on "True random number generators for a more secure IoT", Mar. 2016. Retrieved on [Oct. 29, 2020]. Retrieved from the Internet <https://www.techdesignforums.com/practice/technique/true-random-number-generators-for-more-secure-systems/> (Year: 2016).

S. Burri, D. Stucki, Y. Maruyama, C. Bruschini, E. Charbon and F. Regazzoni, "SPADs for quantum random number generators and U beyond," 2014 19th Asia and South Pacific Design Automation Conference (AS P-DAC), Singapore, 2014, pp. 788-794, doi: 10.1109/ASPDAC.2014.6742986. (Year: 2014).

Duggirala R., Lal A., Radhakrishnan S. (2010) Radioisotope Decay Rate Based Counting Clock. In: Radioisotope Thin-Film Powered Microsystems. MEMS Reference Shelf, vol. 6. Springer, New York, NY. https://doi.org/10.1007/978-1-4419-6763-3_7 ( Year: 2010).

Collantes et al. "Quantum Random Number Generators", 2016 Retrieved from the Internet <https://arxiv.org/pdf/1604.03304.pdf> (Year: 2016).

Rohe, "RANDy—A True-Random Generator Based on Radioactive Decay", 2003. Retrieved from the Internet <https://citeseerx.ist.psu.edu/viewdoc/download?doi=1 0.1.1.11 0.9725&rep=rep1 &type=pdf> (Year: 2003).

* cited by examiner

Bit Position #: 1 2 3 4 5 6 7 8 9 10 11 12 13 14 15 16 17 18 19 20 21 ...
Bits: 0 0 0 1 1 0 1 0 0 0 0 0 1 0 1 1 1 0 1 0 0 ...

FIG. 1

Bit Position #: 1 2 3 4 5 6 7 8 9 10
Bits: 1 1 1 0 0 0 1 1 0 1

FIG. 2

| Bit Position # | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Encoded Message Bits | 1 | 0 | 0 | 1 | 1 | 1 | 0 | 0 | 0 | 0 | 0 | 1 | 1 | 0 | 1 | 1 | 1 | 1 | 1 |
| Quaternary Key Shift | 1 | | | 3 | | 2 | 1 | 1 | | | 3 | | 2 | 1 | 1 | | | 3 | |

FIG. 3

| Bit Position # | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Encoded Message Bits | 1 | 0 | 0 | 1 | 1 | 1 | 0 | 0 | 0 | 0 | 0 | 1 | 1 | 0 | 1 | 1 | 1 | 1 | 1 |
| 1111 Key Shift | 1 | 1 | 1 | 1 | 1 | 1 | 1 | 1 | 1 | 1 | 1 | 1 | 1 | 1 | 1 | 1 | 1 | 1 | 1 |

FIG. 4

| Bit Position # | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Encoded Message Bits | 1 | 0 | 0 | 1 | 1 | 1 | 0 | 0 | 0 | 0 | 0 | 1 | 1 | 0 | 1 | 1 | 1 | 1 | 1 |
| 2121 Key Shift | | 2 | 1 | | 2 | 1 | | 2 | 1 | | 2 | 1 | | 2 | 1 | | 2 | 1 | |

FIG. 5

FIG. 6
Key Conversion/Generation of Magnitude Shift String (K String)
Method 100

FIG. 7
Encoding – Method 200

FIG. 8
Decoding – Method 300

METHOD AND APPARATUS FOR STEGANOGRAPHIC CIPHER ENCRYPTION USING TRUE RANDOM NUMBER GENERATOR

This application claims priority to U.S. Provisional Application Ser. 63/441,979 titled "Method and Apparatus for Steganographic Stream Cipher Encryption Using True Random Number Generator" filed on Jan. 30, 2023, the entire contents of which is incorporated herein by reference in its entirety.

1.0 TECHNICAL FIELD

The present disclosure relates generally to cryptology, specifically using a random number generator to encrypt messages.

2.0 PRIORITY APPLICATIONS AND REFERENCES

This application is further related to U.S. application Ser. No. 17/897,138 titled "Method And Apparatus For Highly Effective On-Chip Quantum Random Number Generator" filed on Aug. 27, 2022; U.S. application Ser. No. 17/861,014 titled "Method And Apparatus For Highly Effective On-Chip Quantum Random Number Generator" filed on Jul. 8, 2022; U.S. Provisional Application Ser. 63/400,899 titled "Method and Apparatus for Highly Effective On-Chip Quantum Random Number Generator" filed on Aug. 25, 2022; U.S. Provisional Application Ser. 63/344,496 titled "Method and Apparatus for Highly Effective On-Chip Quantum Random Number Generator" filed on May 20, 2022; U.S. Provisional Application Ser. 63/279,587 titled "Method for Cost-Effective Nickel-63 Radiation Source for True Random Number Generators" filed on Nov. 15, 2021; U.S. Provisional Application Ser. 63/277,759 titled "Method for Cost-Effective Nickel-63 Radiation Source for True Random Number Generators" filed on Nov. 10, 2021; U.S. Provisional Application Ser. 63/270,912 titled "Method And Apparatus For True Random Number Generator Based On Nuclear Radiation" filed on Oct. 22, 2021; U.S. Provisional Application Ser. 63/224,811 titled "Method And Apparatus For Highly Effective Beta Decay Based On-Chip True Random Number Generator" filed on Jul. 22, 2021; U.S. Provisional Application Ser. 63/234,820 titled "Method And Apparatus For Highly Effective Beta Decay Based On-Chip True Random Number Generator" filed on Aug. 19, 2021; U.S. Provisional Application Ser. 63/235,031 titled "Method And Apparatus For Highly Effective Beta Decay Based On-Chip True Random Number Generator" filed on Aug. 19, 2021; U.S. application Ser. No. 17/687,630 titled "Method for Making Cost-Effective Nickel-63 Radiation Source for True Random Number Generators" filed on Mar. 5, 2022; U.S. application Ser. No. 17/513,661 titled "Method And Apparatus For Highly Effective Beta Decay Based On-Chip True Random Number Generator" filed on Oct. 28, 2021; U.S. application Ser. No. 17/409,971 filed on Aug. 24, 2021 titled "Method And Apparatus For Highly Effective On-Chip True Random Number Generator Utilizing Beta Decay" filed on Aug. 24, 2021; U.S. Provisional Application Ser. 62/984,528 titled "Method And Apparatus For Tritium-Based True Random Number Generator" filed on Mar. 3, 2020; U.S. Provisional Application Ser. 63/062,672 titled "Method And Apparatus For Beta Decay Based True Random Generator" filed on Aug. 7, 2020; U.S. Provisional Application Ser. 62/655,172 titled "Apparatus, Systems, And Methods Comprising Tritium Random Number Generator" filed on Apr. 9, 2018; U.S. Provisional Application Ser. 62/803,476 titled "Apparatus, Systems, And Methods Comprising Tritium Random Number Generator" filed on Feb. 9, 2019 now U.S. Pat. No. 10,430,161; U.S. application Ser. No. 16/273,365 titled "Apparatus, Systems, And Methods Comprising Tritium Random Number Generator" filed on Feb. 12, 2019; U.S. application Ser. No. 16/990,087 titled "Apparatus, Systems, And Methods For Beta Decay Based True Random Number Generator" filed on Aug. 11, 2020 now U.S. Pat. No. 10,901,695; U.S. application Ser. No. 17/126,265 title "Method and Apparatus for Tritium-based True Random Number Generator" filed on Dec. 18, 2020, now U.S. Pat. No. 11,048,478; U.S. application Ser. No. 17/062,307 titled "Apparatus, Systems, And Methods For Beta Decay Based True Random Number Generator" filed on Oct. 2, 2020, now U.S. Pat. No. 11,036,473; PCT Application SN PCT/US19/17748 titled "Apparatus, Systems, And Methods Comprising Tritium Random Number Generator" filed on Feb. 13, 2019; PCT Application SN PCT/US20/65962 titled "Apparatus, Systems, And Methods For Beta Decay Based True Random Number Generator" filed on Dec. 18, 2020; and PCT Application SNPCT/US20/65976 titled "Apparatus, Systems, And Methods For Beta Decay Based True Random Number Generator" filed on Dec. 18, 2020. Each of the patent applications, issued patents, and other references listed above, discussed and/or cited herein, are incorporated by reference as if fully set forth herein.

3.0 BACKGROUND

As opposed to pseudo-random number generators based on numerical algorithms, there are true random number generator (TRNG) devices that depend on natural random processes: multiple bipolar switches, thermal noise, light scattering by dichroic mirrors, chaotic systems, and decay of radioactive nuclei. Some of these TRNGs are listed in the provisional applications to which the present application claims priority, and those references are incorporated herein by reference as if fully set forth herein.

The decay of radioactive nuclei is considered to be the most independent on environmental influences like temperature, pressure, or acceleration. However, typical nuclear-based TRNGs require a large size or number of detectors to enable the registration of particles emitted as a result of radioactive decay. Also, many nuclei used in such devices are highly radioactive and poisonous hence dangerous to humans if a device is broken.

In previous disclosures by the present inventor, a TRNG is disclosed. For example, U.S. Pat. No. 10,901,695 entitled "Apparatus, systems, and methods for beta decay based true random number generator", an array of detectors was employed and a method of adjusting counts by changing the read-out time was described. The contents of that patent are incorporated herein by reference. The source of entropy in the '695 patent was a thin layer of Nickel-63 attached to the inner surface of the metallic cover of the package of the integrated circuit (IC). Likewise in U.S. Pat. No. 11,281,432 entitled "Method and apparatus for true random number generator based on nuclear radiation", an array of detectors was employed to detect electrons (i.e., entropy) from the radiation source. Further, the '432 patent disclosed a method of adjusting the counting rates of these detectors based on the varying diameter of their surface. The disclosed method is very effective in compensating for the limited (finite area) radiation source. However, designing and manufacturing such a detector array is complicated because the typical electrical parameters of a single diode vary considerably with the area. The contents of both the '695 and '432 patents are incorporated herein by reference.

Another solution is described in U.S. patent application Ser. No. 17/861,014 titled "Method and Apparatus for Highly Effective On-chip Quantum Random Number Generator" filed on Jul. 8, 2022, and discloses a true random number generator that includes a CMOS matrix detector with a top surface exposed. A shell is positioned over the top surface and the shell includes a radiation source and a luminophore or scintillator constructed to emit photons toward the top surface when the luminophore or scintillator is struck by electrons from the radioactive decay of the source of the radiation. The CMOS or SPAD detector matrix is constructed to detect the photons emitted from the luminophore or scintillator and to produce a signal for the detected photons. The signal is communicated to a processor that produces true random numbers based on the signal from the detected photons.

The true random numbers generated by these devices may be used to encrypt communications between multiple parties. Described herein is a novel method called Bury Among Random Numbers (BARN) that uses true random numbers to encrypt messages.

4.0 SUMMARY

A method for encryption that combines the steganographic method of concealing data inside a truly random string of bits with a cryptographic key that allows random distribution of this data, essentially creating a symmetrical cipher.

A communication system is disclosed that has an encoding processor/computer and a decoding processor/computer. The encoding processor/computer includes a true random number generator (TRNG) constructed to generate a random number stream, a memory containing a message with a plurality of message bits and a shared key, a transmitter, and an encoder/processor connected to the TRNG, memory, and transmitter, the encoder/processor is constructed to perform the following steps: (a) generate a magnitude shift string based on the shared key and a predetermined algorithm; (b) generate an encrypted message by inserting message bits into the random number stream based on the magnitude shift string; and (c) transmit the encrypted message via the transmitter. The decoding processor/computer includes a second memory containing the shared key, a receiver, and a decoder/processor connected to the second memory and receiver, the decoder/processor is constructed to perform the following steps: (d) generate the magnitude shift string based on the shared key and the predetermined algorithm; (e) generate a decrypted message by extracting bits from the encrypted message based on the magnitude shift string; and (f) store the decrypted message in the second memory.

The communication system may transmit wirelessly and over a computer network that may be public. The predetermined algorithm may preferably result in an octal-based or a quaternary-based magnitude shift string.

The TRNG may include a radioactive substance as the entropy source, as a non-limiting example may be Nickel-63 or tritium. The radioactive substance may produce beta decay.

A method for communication encryption is also disclosed. The method includes (a) generating a random number stream; (b) generating a magnitude shift string based on the shared key and a predetermined algorithm; (c) generating an encrypted message by inserting message bits from a message into the random number stream based on the magnitude shift string; and (d) transmitting the encrypted message.

The method may further include the following decryption steps: (e) generating a decrypted message by extracting bits from the encrypted message based on the magnitude shift string; and (f) storing the decrypted message.

The method may transmit wirelessly and over a computer network that may be public. The predetermined algorithm may preferably result in an octal-based or a quaternary-based magnitude shift string.

Step (a) may be based on the decay of a radioactive substance, for example, but not limited to Nickel-63 or tritium. The radioactive substance may produce beta decay.

An encoding processor is also disclosed that includes a true random number generator (TRNG) constructed to generate a random number stream, a memory containing a message with a plurality of message bits and a shared key, a transmitter, and an encoder/processor connected to the TRNG, memory, and transmitter. The encoder/processor may perform the following steps: (a) generate a magnitude shift string based on the shared key and a predetermined algorithm; (b) generate an encrypted message by inserting message bits into the random number stream based on the magnitude shift string; and (c) transmit the encrypted message via the transmitter.

The encoding processor may transmit wirelessly and over a computer network that may be public. The predetermined algorithm may preferably result in an octal-based or a quaternary-based magnitude shift string.

The TRNG may include a radioactive substance as the entropy source, as a non-limiting example may be Nickel-63 or tritium. The radioactive substance may produce beta decay.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

6.0 DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in a singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds to the attached figures and is provided for ease of reference, where like reference numerals designate corresponding features throughout the specification and figures:

Key Conversion/Generation of Magnitude Shift String Method 100 (steps 102-125B)
Encoding Method 200 (steps 205-255)
Decoding Method 300 (steps 305-345)
Encoding Computer/Processor 405
True Random Number Generator 405a
Secret Key in Memory 405b
Encoder/Processor 405c
Message in Memory 405d
Encrypted Message in Memory 405e
Internet 407
Wireless Transmission 408
Decoding Computer/Processor 410
Encrypted Message in Memory 410a
Secret Key in Memory 410b
Decoder/Processor 410c
Decrypted Message in Memory 410d This is related to our previous published US patents and applications listed above, in which we described the general idea of using pure beta minus (electron emission) nuclear decay as a medium or source of entropy for generating true random numbers by detecting emitted electrons on the chip through an electronic sensor or array of sensors. In this application, we would like to present an approach to encrypt a message using the random numbers generated from our previous work.

The method described herein is coined Bury Among Random Numbers (BARN). Unlike present cipher standards e.g., AES, the BARN method requires low computational resources and perfectly fits applications in Internet-of-Things devices. The BARN method combines steganographic (derived from the Greek word stegano meaning concealed) methods of concealing data into a truly random string of bits with a secret cryptographic (derived from the Greek word crypto meaning secret) key, essentially creating a symmetrical cipher.

The apparatus includes a physical (true, preferentially quantum) random number generator (TRNG) that creates a constant stream of random bits in time. One could deploy pseudo-RNG (algorithmic) in the BARN method but such use would be prone to easier breaking by the analysis of a pattern of bits.

Herein we used a prototype TRNG apparatus manufactured by RANDAEMON as per U.S. Pat. No. 10,901,695 with entropy extracted via comparisons of time differences between two pairs of beta decays recorded. The TRNG generator was tested with NIST (Bassham L., Rukhin A., Soto J., Nechvatal J., Smid M., Leigh S., Levenson M., Vangel M., Heckert N. and Banks D. (2010) *A Statistical Test Suite for Random and Pseudorandom Number Generators for Cryptographic Applications, Special Publication* (*NIST SP*), National Institute of Standards and Technology, Gaithersburg, MD) and ENT (Walker J. (2008) *ENT—A Pseudorandom Number Sequence Test Program*, [online] https://www.fourmilab.ch/random/) tests and passed them all positively, i.e., generated sequences of random bits were statistically truly random. The BARN cipher requires a secure distribution of a secret key, similar to a seed of a pseudo-RNG that is the basis of typical ciphers. In the BARN method, a key enables the random spread of bits of a message among the bits of the TRNG stream.

The BARN algorithm is described in pseudo-code as follows. Referencing FIG. 6, the method of converting a secret key 100 into a magnitude shift string is shown:
1. Obtain a secret key k (Step 102)
2. Optionally, discard the least significant bit of key k (Step 105) if the group of bits used in the following step 4 is not even e.g., for octal conversion
3. Start a counter j=1 (Step 107)
4.1 Octal Conversion: convert the key k into a set of m octal, non-zero digits from the range {1, . . . , 7}. On average for a 256-bit key, there will be m=INT(256/3*(1-⅛))=74 non-zero octal digits. (Steps 110A, 115A, 120A, 122A, 125A)
   a. take consecutive 3 bits from the key (Step 110A)
   b. if all 3 bits are equal to zero, then discard this group otherwise convert them into octal digit $k_j$ (Steps 110A and 115A)
   c. store octal digit at position j of Key String K (Step 120A)
   d. increase counter j by 1 (Step 122A)
   e. repeat (a), (b), (c), and (d) (Steps 110A, 115A, 120A, 122A) until all bits of key k are used (Step 125A)

Figure 6:
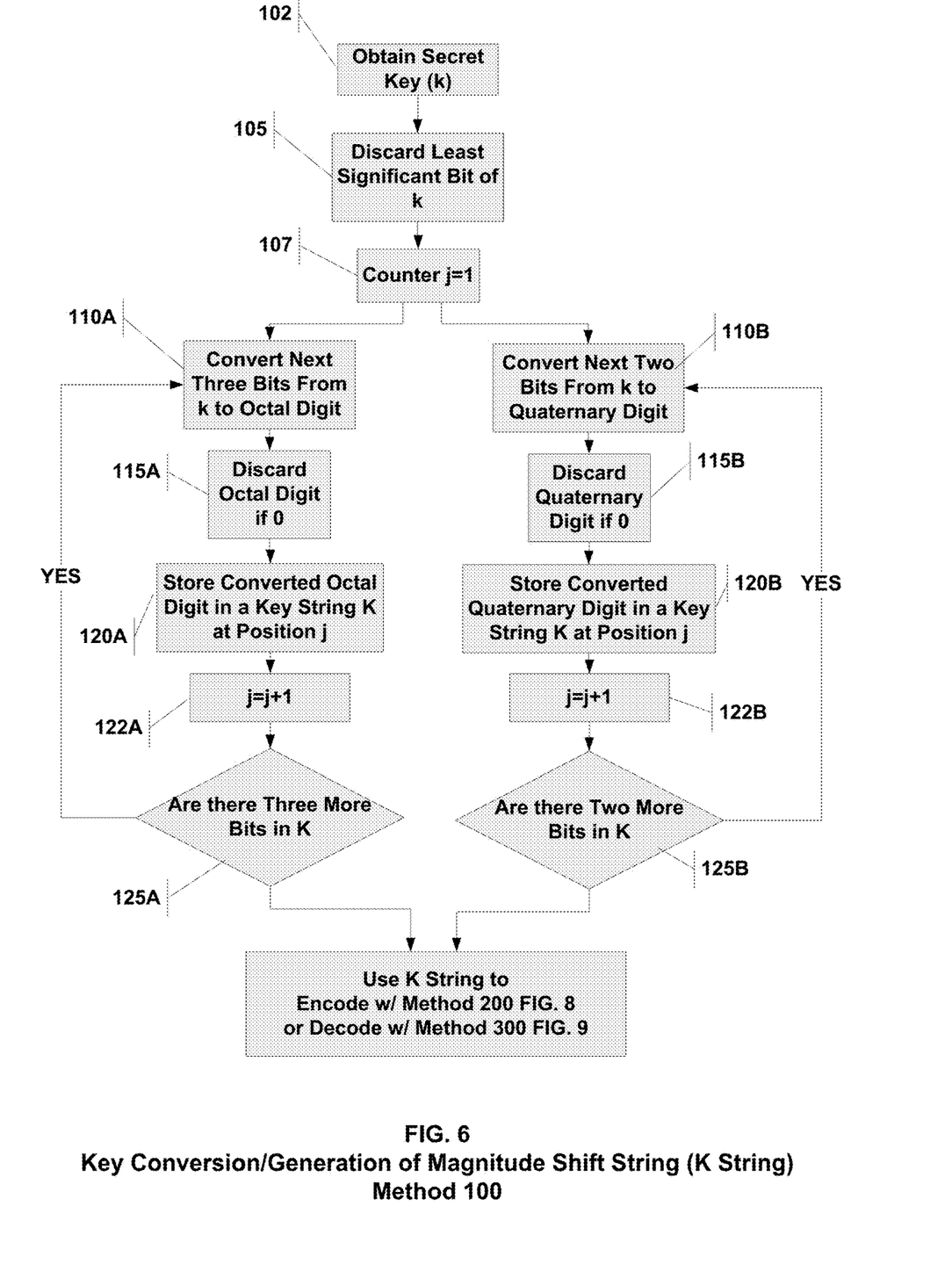
FIG. 6 is a flowchart illustrating the key conversion to both a set of quaternary and octal shifts.

4.2 Quaternary Conversion: convert the key k into a set of m quaternary, non-zero digits from the range (1, 2, 3). On average for a 256-bit key, there will be m=INT (256/2*(1-¼))=96 non-zero quaternary digits. (Steps 110B, 115B, 120B, 122B, 125B)
  a. take consecutive 2 bits from the key (Step 110B)
  b. if all 2 bits are equal to zero, then discard this group otherwise convert them into quaternary digit $k_j$ (Steps 110B and 115B)
  f. store quaternary digit at position j of Key String K (Step 120B)
  g. increase counter j by 1 (Step 122B)
  c. repeat (a), (b), (c), and (d) (Steps 110B, 115B, 120B, 122B) until all bits of key k are used (Step 125B)

Now the stored digits (octal, or quaternary), which are a magnitude shift string, can be used to encode a message or decode an encrypted message.

Another counting system like decimal (9 digits excluding zero) or hexadecimal (15 digits excluding zero) can be used in BARN with a similar conversion of the 256-bit key into digits $k_j$ as mentioned in 4.2 above.

While converting text into ASCII text to be coded, it is necessary to ensure that either "big-endian" or "little-endian" encoding for ASCII characters is used consistently on both ends of the communication channel. In a "big-endian" scheme, the most significant bit is located at the smallest memory address and the least significant at the largest. "Little-endian" is the converse.

Figure 7:
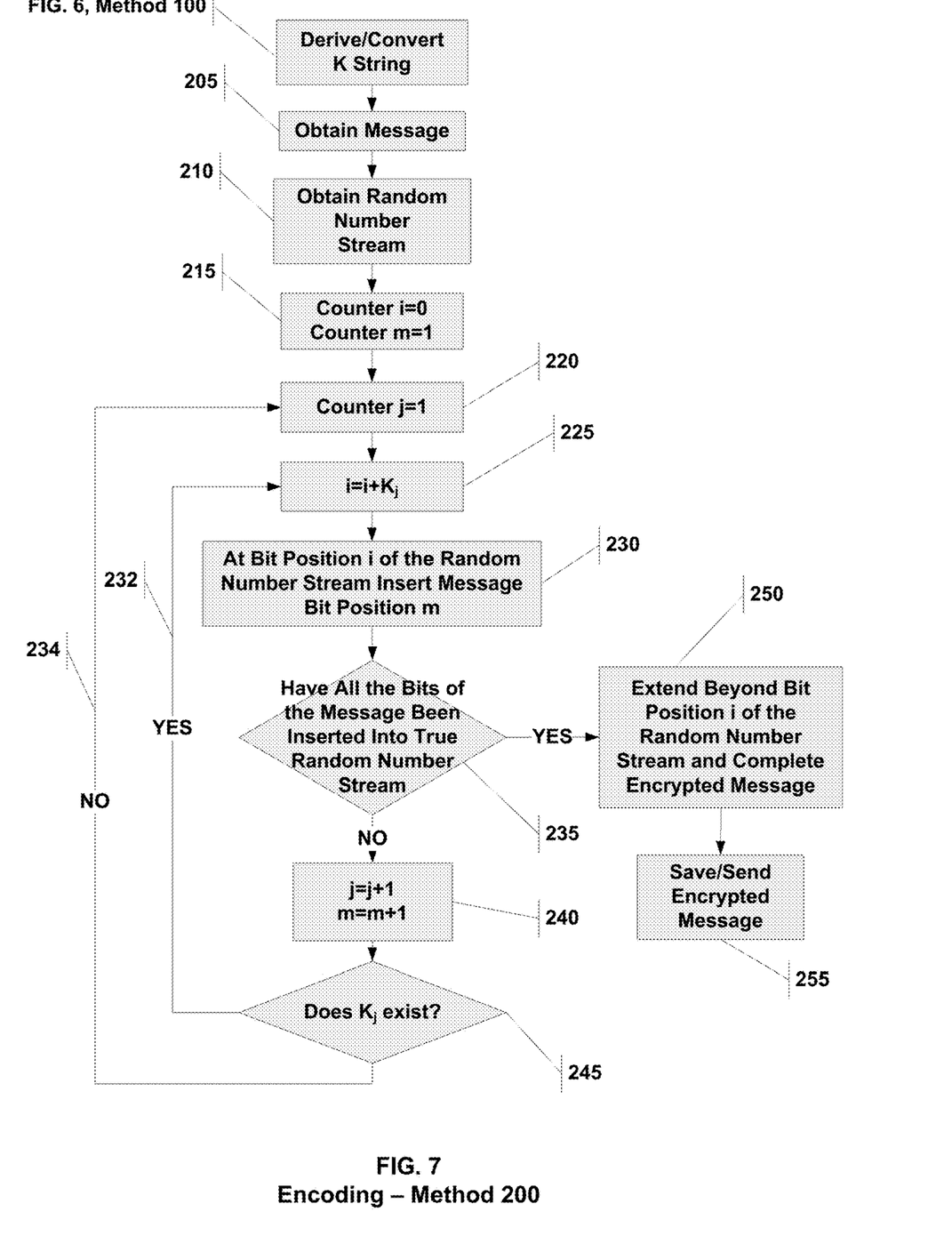
FIG. 7 is a flowchart illustrating the encoding method.

The BARN method to encode a message 200 is shown in FIG. 7:
1. Derive key string/magnitude shift string (discussed above with respect to FIG. 6)
2. Obtain message (Step 205)
3. Obtain true random number stream (Step 210)
4. Insert the first bit of the message instead of the bit $k_1$ of the random string (Step 230).
5. Insert the second bit of the message instead of the bit $k_1+k_2$ of the random string and repeat inserting bits of the message into a random stream of bits as a bit number $k_1+k_2+\ldots+k_j$ where $j\in\{1, m\}$ (Loop 232).
6. Check if all the bits of the message have been inserted (Step 235)
7. If the number of bits in the message is larger than m i.e., $k_m$ does not exist, then use the $k_j$ set of numbers repeatedly starting again with $k_1$, etc. until the whole message is inserted into a random stream of bits (Step 245, Loop 234)
8. If all the message bits have been inserted (YES step 235), then add random bits to the end of the message (Step 250)
  a. Optimally, if $k_j$ was the last octal digit used to encrypt the message, then add $k_{j+1}-1$ random bits at the end of the encrypted message. This way during decryption, at the end of reading the encrypted message none of the random bits will be considered part of the decrypted message.
9. Save/send the encrypted message (Step 255)

A number of counters may be used (see steps 215, 220, 225, and 245) to implement the encoding method.

Figure 8:
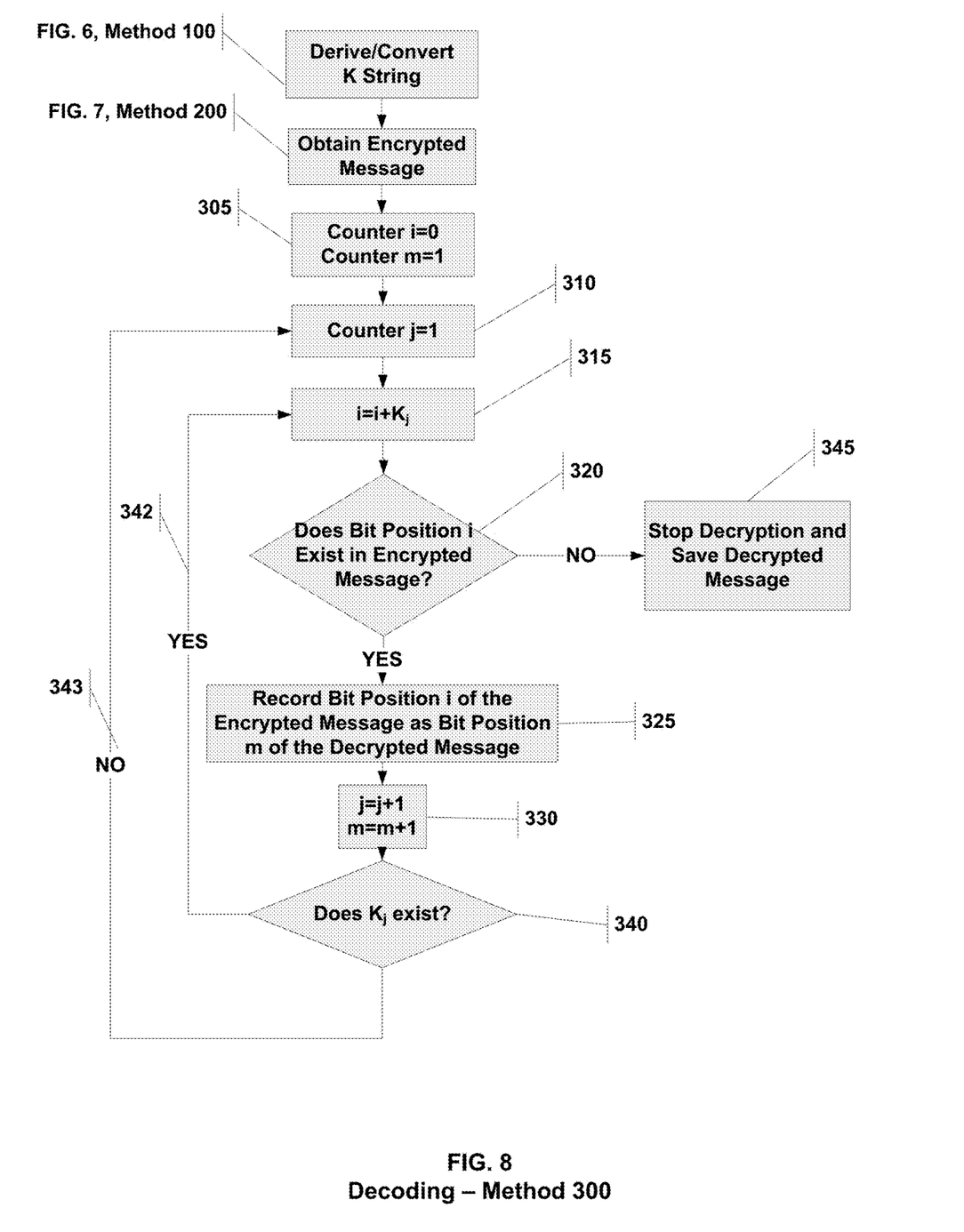
FIG. 8 is a flowchart illustrating the decoding method.

The BARN method to decode 300 is shown in FIG. 8:
1. Derive key string/magnitude shift string (discussed above with respect to FIG. 6)
2. Obtain encrypted message (discussed above with respect to FIG. 7)
3. Shift from the start of the encrypted message to position $k_1$ as the first bit of the decrypted message, and record this bit (Step 325)
4. Shift from the start of the encrypted message to position $k_1+k_2$ as the second bit of the decrypted message, record this bit, and repeat shifting by $k_1+k_2+\ldots+k_j$ where $j\in\{1, m\}$ and keep recording bits of the decrypted message as a bit number j (Loop 342)
5. If the number of bits in the encrypted message is larger than m i.e., $k_m$ does not exist but there are still bits left in the encrypted message, then use the $k_j$ set of numbers repeatedly starting again with $k_1$, etc. until the whole encrypted message is decoded (Step 340, Loop 343)
6. If the shifted position does not exist in the encrypted message, then the decrypted message is complete (Step 320)
7. Stop decryption and save the decrypted message (Step 345)

A number of counters may be used (see steps 215, 220, 225, and 245) to implement the decoding method.

Figure 1:
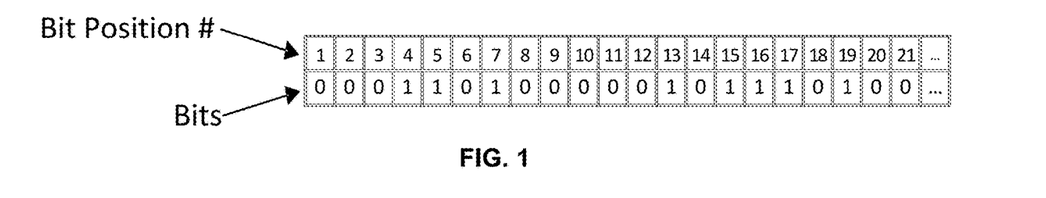
FIG. 1 illustrates a stream of random bits generated from a true random number generator.
Figure 2:
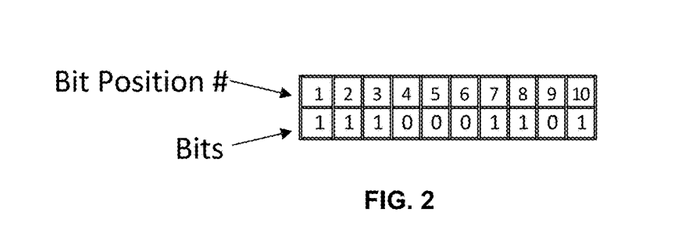
FIG. 2 illustrates a short message that is 10 bits long.
Figure 3:
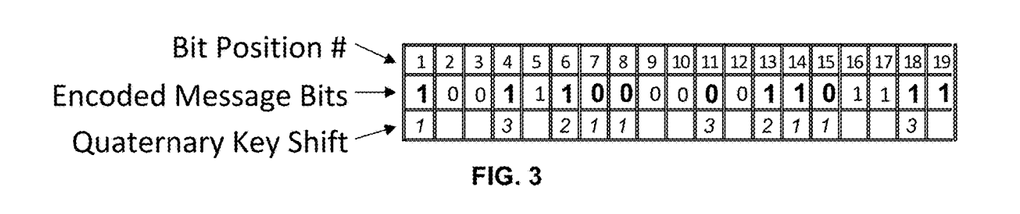
FIG. 3 illustrates the message of FIG. 2 embedded into the random bit stream of FIG. 1 using the quaternary shifts.

With reference to FIGS. 1 through 5, the BARN method is used to encrypt a short message. FIG. 1 illustrates a stream of random bits generated by a true random number generator. FIG. 2 is the message—i.e., a short 10-bit message that represents the number 711 in binary (converted directly from the bits and not via ASCII codes for the simplicity of an example; the least significant bit is the first on the left because the numbering of the bits in the message is the same as in the random stream i.e., from left to right).

Figure 5:
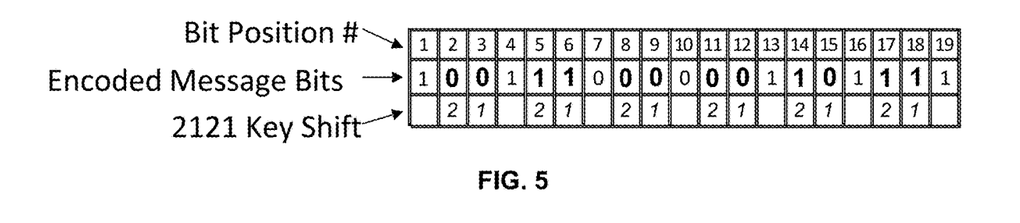
FIG. 5 illustrates the decryption of a message from FIG. 3, with a guessed key of 2121.

Using exemplary quaternary key k={1, 3, 2, 1} to encode the message (FIG. 2) into the random stream (FIG. 1) yields the encoded message bit stream shown in FIG. 5. The encoded message begins with the random stream until the first shift $k_1$ (i.e., 1) is met—i.e., bit position 1. The first message's bit of "1" is substituted into the random stream at this bit position and the random stream continues until the bit position shifted by $k_1+k_2$ (i.e., 1+3) is met (i.e., bit position 4), then the next bit of the message is substituted into the random stream. The random stream continues from bit position 4 until the bit position shifted by $k_1+k_2+k_3$ (i.e., 1+3+2) is met and the next bit of the message is substituted into the random stream. This continues for message bit substitution for position shifted by $k_1+k_2+k_3+k_4$. Since in this example there is just a short, four-digit key, the key has to be used again, such that the next bit substitution is at bit $k_1+k_2+k_3+k_4+k_1$. This method is repeated until all the bits in the message have been substituted into the random stream, after which the random bits can be added.

The example above shows that for keys limited to quaternary digits 1, 2, and 3 (average 2), the encrypted message is about 2× longer than the message. This can be a useful encryption method for long messages e.g., for encryption of speech or video. From a secret key of 256 bits, one can obtain 128 numbers in the range between 0 and 3 with an average of 32 zeroes thus getting on average 96 elements for the key k. When all 7 octal digits of the key k are used (average 4), on average the encrypted message file will be 4× longer than the message but much harder to decrypt (many more combinations possible). For example, when 7 objects are combined in a sample of size 74 then the number of permutations with repetitions is $7^{74}>2^{26}$, leading indirectly to the knapsack problem, which is known to be NP-complete. For the simplified model of the limited number of quaternary digits used in the example above, there are $3^{96}$ permutations with repetitions of 3 digits on 96 positions, which is larger than $2^{152}$. These big numbers suggest that the BARN method can be NP-complete.

Figure 4:
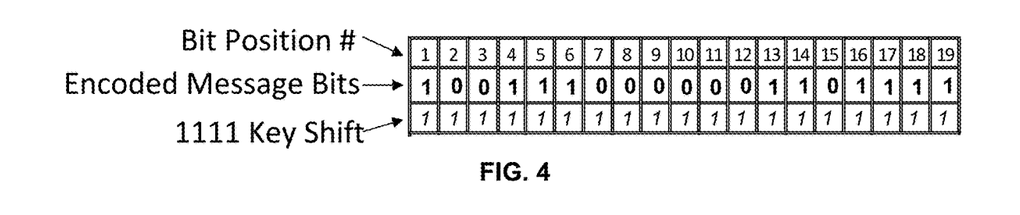
FIG. 4 illustrates the decryption of a message from FIG. 3, with a guessed key of 1111.

Attempting to brute force decryption of the encrypted message is shown in FIGS. 4 and 5. In FIG. 6, the key k={1, 1, 1, 1} is used meaning that all the digits of the encrypted message will be used to decode the original message. This converts all bits of the stream with an encrypted message into the number 503865 (assuming direct conversion of bits into a number without using ASCII codes in between). Another example of a possible decryption with a key k={2, 1, 2, 1} shows a result of 3340 that is also plausible but not related to the original message at all. While decrypting longer streams of bits, the number of plausible solutions becomes enormous and thus very effectively helps to hide the true message that was encrypted.

Figure 9A:
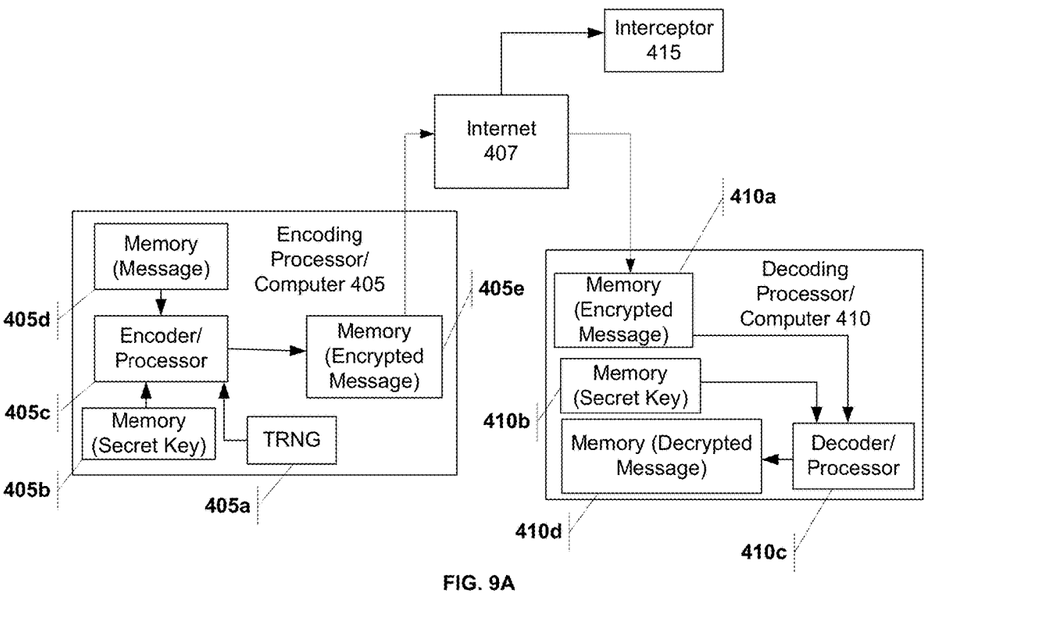
FIG. 9A illustrates a system that implements the methods described herein.
Figure 9B:
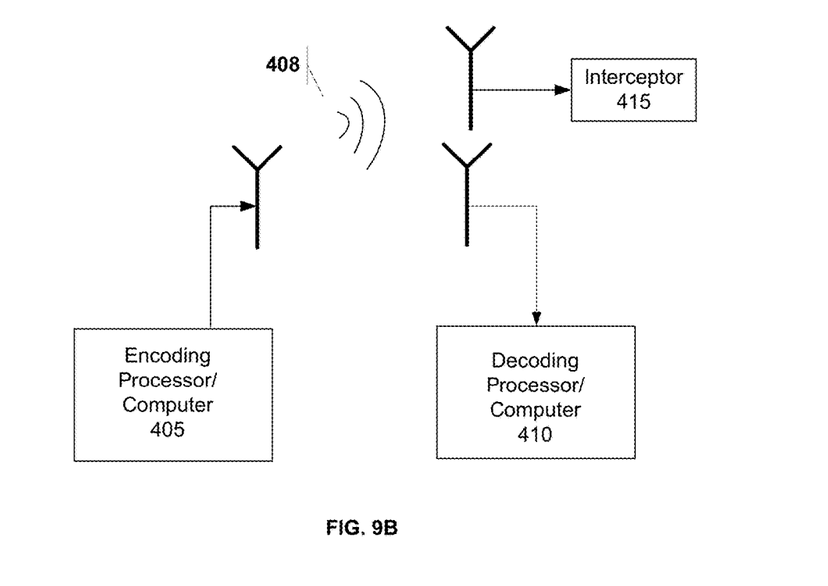
FIG. 9B illustrates a system that implements the methods described herein.

FIG. 9A illustrates a system that may implement the methods described above. Encoding Computer/Processor 405 has a True Random Number Generator (TRNG) 405 and a secret key stored in memory 405b. The Encoder/Processor 405c can convert the secret key into a set of shift magnitudes as described in method 100 above. The Encoder/Processor 405c can then encode a message obtained from memory 405d by the method described in method 200 above, yielding encrypted message 405e. It should be noted that the secret key, message, and encrypted message may be stored in the same memory of the Encoding Computer/Processor 405, or in multiple memories. Also, the TRNG 405a may generate a number of true random numbers which may be stored in the memory and accessed by the encoder/processor 405c. The encrypted message may be sent to Decoding Computer/Processor 410 via any number of communication links, but shown in FIG. 9A via the internet 407 and in FIG. 9B via a direct wireless connection 408. Decoding Computer/Processor 410 receives the encrypted message and may store it in memory 410a. Decoding Computer/Processor 410 also knows the secret key a priori which may also be stored in memory 410b. The Decoder/Processor 410c can convert the secret key into a set of shift magnitudes as described in method 100 above. The Decoder/Processor 410c can then decode the encrypted message obtained from memory 410a by the method 200 described above, yielding decrypted message 410d. While an interceptor 415 may have access to the encrypted message, it does not have the shared key and therefore cannot generate the set of shift magnitudes necessary to decrypt the message. Using brute force to decrypt the message may be computationally expensive, especially if the set of shift magnitudes has a more discrete possibility—for example using 4 bits of the secret key to generate a hexadecimal with 15 possible shift magnitudes. Multiplicities of each of the elements $k_j$ by the same factor e.g., 8 or some other natural number larger than 1 can be also used to increase the security of encryption. Such a step is not necessary if the length of the encrypted text matters— enlarging insertion steps several times makes an encrypted text look "more random" to the possible attacker thus making decryption harder.

Any of the suitable technologies, materials, and designs set forth and incorporated herein may be used to implement various example aspects of the invention as would be apparent to one of skill in the art.

While operations may be depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements, and variations can be made without departing from the scope and spirit of this invention, based on what is described and illustrated in this patent document While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A communication system comprising:
  an encoding processor/computer comprising:
    a true random number generator (TRNG) constructed to generate a random number stream;
    a memory containing a message with a plurality of message bits and a shared key; a transmitter;
    an encoder/processor connected to the TRNG, to the memory, and to the transmitter, the encoder/processor constructed to perform the following steps:
      a. generate a magnitude shift string based on the shared key and based on a predetermined algorithm that is independent of the random number stream;
      b. generate an encrypted message by inserting message bits into the random number stream based on the magnitude shift string;
      c. insert random bits into the encrypted message after message bits; and
      d. transmit the encrypted message via the transmitter;
  and a decoding processor/computer comprising:
    a second memory containing the shared key;
    a receiver;
    a decoder/processor connected to the second memory and to the receiver, the decoder/processor constructed to perform the following steps:
      e. generate the magnitude shift string based on the shared key and based on the predetermined algorithm that is independent of the random number stream
      f. generate a decrypted message by extracting bits from the encrypted message based on the magnitude shift string; and
      g. store the decrypted message in the second memory.

2. The communication system of claim 1, wherein the transmitter is wireless.

3. The communication system of claim 1, wherein the transmitter transmits the encrypted message to the receiver via a computer network.

4. The communication system of claim 3, wherein the computer network is public.

5. The communication system of claim 1, wherein the predetermined algorithm results in an octal-based magnitude shift string.

6. The communication system of claim 1, wherein the predetermined algorithm results in a quaternary-based magnitude shift string.

7. The communication system of claim 1, wherein the TRNG comprises a radioactive substance as the entropy source.

8. The communication system of claim 7, wherein the radioactive substance produces beta decay.

9. The communication system of claim 7, wherein the radioactive substance comprises Nickel-63 or tritium.

10. A method for communication encryption comprising:
   a. generating a random number stream;
   b. generating a magnitude shift string based on the shared key and a predetermined algorithm that is independent of the random number stream;
   c. generating an encrypted message by inserting message bits from a message into the random number stream based on the magnitude shift string;
   d. inserting random bits into the encrypted message after message bits; and
   e. transmitting the encrypted message.

11. The method of claim 10, further comprising:
   f. generating a decrypted message by extracting bits from the encrypted message based on the magnitude shift string; and
   g. storing the decrypted message.

12. The method of claim 10, wherein the transmission step (e) is performed wirelessly.

13. The method of claim 10, wherein the transmission step (e) is performed via a computer network.

14. The method of claim 13, wherein the computer network is public.

15. The method of claim 10, wherein the predetermined algorithm results in an octal-based magnitude shift string.

16. The method of claim 10, wherein the predetermined algorithm results in a quaternary-based magnitude shift string.

17. The method of claim 10, wherein step (a) is based on the decay of a radioactive substance.

18. The method of step 17, wherein the radioactive substance produces beta decay.

19. The method of step 17, wherein the radioactive substance comprises Nickel-63 or tritium.

20. An encoding processor comprising:
   a true random number generator (TRNG) constructed to generate a random number stream;
   a memory containing a message with a plurality of message bits and a shared key;
   a transmitter;
   an encoder/processor connected to the TRNG, to the memory, and to the transmitter, the encoder/processor constructed to perform the following steps:
      a. generate a magnitude shift string based on the shared key and based on a predetermined algorithm that is independent of the random number stream;
      b. generate an encrypted message by inserting message bits into the random number stream based on the magnitude shift string;
      c. insert random bits into the encrypted message after message bits; and
      d. transmit the encrypted message via the transmitter.

21. The encoding processors of claim 20, wherein the transmitter is wireless.

22. The encoding processors of claim 20, wherein the transmitter transmits the encrypted message to the receiver via a computer network.

23. The encoding processors of claim 22, wherein the computer network is public.

24. The encoding processors of claim 20, wherein the predetermined algorithm results in an octal-based magnitude shift string.

25. The encoding processors of claim 20, wherein the predetermined algorithm results in a quaternary-based magnitude shift string.

26. The encoding processors of claim 20, wherein the TRNG comprises a radioactive substance as the entropy source.

27. The encoding processors of claim 26, wherein the radioactive substance produces beta decay.

28. The encoding processors of claim 26, wherein the radioactive substance comprises Nickel-63 or tritium as the entropy source.

* * * * *